United States Patent
Ishida et al.

(10) Patent No.: US 10,611,635 B2
(45) Date of Patent: Apr. 7, 2020

(54) HYDROGEN GAS RECOVERY SYSTEM AND HYDROGEN GAS SEPARATION AND RECOVERY METHOD

(71) Applicant: Shin-Etsu Chemical Co., Ltd., Tokyo (JP)

(72) Inventors: Masahiko Ishida, Joetsu (JP); Shigeyoshi Netsu, Joetsu (JP); Hiroshi Saito, Joetsu (JP); Shuji Tanaka, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 15/751,359

(22) PCT Filed: Aug. 2, 2016

(86) PCT No.: PCT/JP2016/072591
§ 371 (c)(1),
(2) Date: Feb. 8, 2018

(87) PCT Pub. No.: WO2017/038346
PCT Pub. Date: Mar. 9, 2017

(65) Prior Publication Data
US 2018/0237298 A1  Aug. 23, 2018

(30) Foreign Application Priority Data
Aug. 28, 2015  (JP) .................. 2015-169231

(51) Int. Cl.
*C01B 3/58* (2006.01)
*B01J 20/20* (2006.01)
(Continued)

(52) U.S. Cl.
CPC ............. *C01B 3/58* (2013.01); *B01D 53/002* (2013.01); *B01D 53/04* (2013.01);
(Continued)

(58) Field of Classification Search
CPC ...................................................... C01B 3/58
See application file for complete search history.

(56) References Cited

U.S. PATENT DOCUMENTS 5,051,117 A   9/1991  Prigge et al.
5,171,333 A * 12/1992  Maurer .................. B01D 53/02
                                                          95/100
(Continued)

FOREIGN PATENT DOCUMENTS

EP   0 529 593 A1   3/1993
JP   2-184501       7/1990
(Continued)

OTHER PUBLICATIONS

International Search Report dated Sep. 13, 2016, issued in counterpart International Application No. PCT/JP2016/072591 (3 pages).
(Continued)

*Primary Examiner* — Douglas B Call
(74) *Attorney, Agent, or Firm* — Westerman, Hattori, Daniels & Adrian, LLP (57) ABSTRACT

A hydrogen gas recovery system according to the present ingestion is configured by a condensation and separation apparatus (A) that condenses and separates chlorosilanes from a hydrogen-containing reaction exhaust gas exhausted from a polycrystalline silicon production step, a compression apparatus (B) that compresses the hydrogen-containing reaction exhaust gas, an absorption apparatus (C) that absorbs and separates hydrogen chloride by contacting the hydrogen-containing reaction exhaust gas with an absorption liquid, a first adsorption apparatus (D) comprising an adsorption column filled with activated carbon for adsorbing and removing methane, hydrogen chloride, and part of the chlorosilanes each contained in the hydrogen-containing reaction exhaust gas, a second adsorption apparatus (E) comprising an adsorption column filled with synthetic zeo-
(Continued)

lite that adsorbs and removes methane contained in the hydrogen-containing reaction exhaust gas, and a gas line (F) that recovers a purified hydrogen gas having a reduced concentration of methane.

9 Claims, 3 Drawing Sheets (51) Int. Cl.
    *C01B 33/035* (2006.01)
    *B01J 20/18* (2006.01)
    *C01B 7/07* (2006.01)
    *B01D 53/82* (2006.01)
    *B01D 53/96* (2006.01)
    *C01B 7/03* (2006.01)
    *B01D 53/75* (2006.01)
    *C01B 3/56* (2006.01)
    *B01D 53/14* (2006.01)
    *B01D 53/00* (2006.01)
    *B01D 53/04* (2006.01)
    *C01B 3/52* (2006.01)
    *C01B 3/50* (2006.01)
    *B01J 20/34* (2006.01)

(52) U.S. Cl.
    CPC ......... *B01D 53/1481* (2013.01); *B01D 53/75* (2013.01); *B01D 53/82* (2013.01); *B01D 53/96* (2013.01); *B01J 20/18* (2013.01); *B01J 20/186* (2013.01); *B01J 20/20* (2013.01); *B01J 20/3408* (2013.01); *B01J 20/3416* (2013.01); *B01J 20/3458* (2013.01); *C01B 3/50* (2013.01); *C01B 3/52* (2013.01); *C01B 3/56* (2013.01); *C01B 7/03* (2013.01); *C01B 7/0706* (2013.01); *C01B 7/0712* (2013.01); *C01B 7/0725* (2013.01); *C01B 33/035* (2013.01); *B01D 2253/102* (2013.01); *B01D 2253/108* (2013.01); *B01D 2256/16* (2013.01); *B01D 2257/102* (2013.01); *B01D 2257/108* (2013.01); *B01D 2257/502* (2013.01); *B01D 2257/504* (2013.01); *B01D 2257/553* (2013.01); *B01D 2257/702* (2013.01); *B01D 2257/7025* (2013.01); *B01D 2258/0216* (2013.01); *B01J 2220/603* (2013.01); *C01B 2203/042* (2013.01); *C01B 2203/048* (2013.01); *C01B 2203/0415* (2013.01); *C01B 2203/0465* (2013.01); *Y02C 10/08* (2013.01); *Y02C 20/20* (2013.01)

(56) References Cited

U.S. PATENT DOCUMENTS

| | | |
|---|---|---|
| 2001/0045160 A1 | 11/2001 | Hirano et al. |
| 2012/0198998 A1 | 8/2012 | Kurosawa |

FOREIGN PATENT DOCUMENTS

| | | | |
|---|---|---|---|
| JP | 5-213697 A | | 8/1993 |
| JP | 2002-3208 A | | 1/2002 |
| JP | 2004-284875 A | | 10/2004 |
| JP | 3727470 B2 | | 12/2005 |
| JP | 2008-143775 A | | 6/2008 |
| JP | 2009-62252 A | | 3/2009 |
| JP | 2010-184831 | | 8/2010 |
| JP | 2011-84422 A | | 4/2011 |
| WO | WO2011/045880 | * | 4/2011 |

OTHER PUBLICATIONS

Ishikawa et al., "Modern Carbon Industry", Kindai-Hensyu Co., Ltd., Oct. 20, 1980, pp. 160-161, cited in Specification, w/English partial translation (4 pages).

"FY1980-1987 Outsourcing Progress report of New Energy Development Organization", Shin-Etsu Chemical Co., Ltd., Nov. 1988, cited in Specification, w/English partial translation (20 pages).

* cited by examiner

HYDROGEN GAS RECOVERY SYSTEM AND HYDROGEN GAS SEPARATION AND RECOVERY METHOD

TECHNICAL FIELD

The present invention relates to a hydrogen gas recovery system and a hydrogen gas separation and recovery method, and, in more detail, to a technique that enables cyclic use of a highly purified hydrogen gas by separating and recovering hydrogen from a reaction exhaust gas exhausted from a polycrystalline silicon production apparatus using trichlorosilane as a raw material.

BACKGROUND ART

In a polycrystalline silicon production step using trichlorosilane ($HSiCl_3$) as a raw material, the reaction represented by the following formula mainly progresses to produce polycrystalline silicon according to formula 1.

$$HSiCl_3 + H_2 \rightarrow Si + 3HCl \quad \text{(formula 1)}$$

$$HSiCl_3 + HCl \rightarrow SiCl_4 + H_2 \quad \text{(formula 2)}$$

In producing polycrystalline silicon by a Siemens method, trichlorosilane and hydrogen each being a raw material gas are contacted with a guard frame type (inverse u letter type) silicon core wire heated in a reactor to grow polycrystalline silicon on the surface of the silicon core wire through vapor phase epitaxy by a CVD (Chemical Vapor Deposition) method.

Heating the silicon core wire is conducted by electrical heating, and therefore carbon that has high electrical conductivity and heat resistance and is less susceptible to metal pollution is used as a member in the reactor. Examples of the carbon member include a core wire holder for electrifying a silicon cote wire, and a heater for conducting initial heating for electrifying a high-purity, high-resistant silicon core wire.

According to Non Patent Literature 1 ("RECENT CARBON TECHNOLOGY" written by Ishikawa, Toshikatsu and Nagaoki, Toru), it has been understood that carbon reacts with hydrogen at a temperature of 900° C. or higher. A carbon member in a reactor when polycrystalline silicon is deposited is subjected to heat conduction or radiant heat from a silicon core wire, which is being electrically heated, to be at a high temperature, as high as 900° C. or higher, and therefore hydrogen being a supply gas reacts with carbon to produce a slight amount of methane according to the following formula 3.

$$C + 2H_2 \rightarrow CH_4 \quad \text{(formula 3)}$$

In addition to this reaction, a slight amount of methyldichlorosilane having a boiling point close to that of trichlorosilane is contained in trichlorosilane being a raw material gas, and therefore these are decomposed into methane under the reaction conditions of deposition of polycrystalline silicon (see Patent Literature 1(Japanese Patent No. 3727470)).

Accordingly, a slight amount of methane is contained in a reaction exhaust gas exhausted from a polycrystalline silicon production apparatus in addition to tetrachlorosilane, hydrogen, a slight amount of hydrogen chloride (HCl), and unreacted trichlorosilane which are shown in the formula 1 and formula 2.

In addition to these, slight amounts of monochlorosilane ($SiH_3Cl$) and dichlorosilane ($SiH_2Cl_2$) are also contained in the reaction exhaust gas as other by-product gases.

It is to be noted that tetrachlorosilane, trichlorosilane, and dichlorosilane will be collectively referred to as trichlorosilanes hereinafter, and the liquids thereof will be collectively referred to as chlorosilane liquids.

Incidentally, in the case where trichlorosilane is converted into silicon by the Siemens method, the conversion rate is low, as low as several to around 10%, and therefore the amount of a raw material gas to be supplied to a reactor have to be large, as large as 15 to 50 $Nm^3$ per 1 kg of deposited silicon. Most of the raw material gas supplied to the reactor is exhausted from the reactor as a reaction exhaust gas, and therefore curbing the loss of the raw material gas becomes necessary to curb production cost. That is, a technique for recovering the reaction exhaust gas to achieve high purification of trichlorosilane and hydrogen, and, on top of that, suppling the trichlorosilane and the hydrogen to a polycrystalline silicon production apparatus again as a raw material gas is essential.

In such a hydrogen gas recovery system, generally, a reaction exhaust gas exhausted from a polycrystalline silicon production apparatus is first separated into hydrogen and the other components with a hydrogen recovery and circulation apparatus directly connected to the polycrystalline silicon production apparatus, and separated hydrogen is then recovered and introduced into the polycrystalline silicon production apparatus again. Examples of such a system are disclosed, for example, in Non Patent Literature 2 ("Report on Outcome of Commission Committed by New Energy Development Organization 1980-1987, Development of Solar Power Generation for Practical Use, Verification of Low Cost Silicon Experiments (development of reduction of chlorosilane by hydrogen), summary version"), Patent Literature 2 (Japanese Patent Laid-Open No. 2008-143775), and Patent Literature 3 (Japanese Patent Laid-open No. 2011-84422) are known.

In such conventional hydrogen gas recovery systems, a method has been adopted in which the chlorosilanes are first condensed and separated, a hydrogen chloride gas is then absorbed and separated with a low-temperature chlorosilane liquid, and the chlorosilanes and hydrogen chloride which are slightly left are finally adsorbed and separated with activated carbon; however, the conventional hydrogen gas recovery systems are not configured to be intended to positively remove methane contained in the exhaust gas.

In adsorbing and separating the chlorosilanes and hydrogen chloride with activated carbon, methane is also adsorbed and removed slightly, but the concentration of methane in a large amount of hydrogen is extremely low, as low as several hundred ppb to several ppm, and therefore the amount of methane to be adsorbed with activated carbon is extremely slight, and most of methane is practically supplied to the polycrystalline silicon production apparatus again without being removed. As a result, when the recovery rate of hydrogen is increased, the concentration of methane in recovered hydrogen is also increased with the increase in the recovery rate.

When such recovered hydrogen is re-supplied to the polycrystalline silicon production apparatus, carbon that is a constitutional element of methane becomes easy to be incorporated in polycrystalline silicon to be deposited (see, for example, Patent Literature 1) to be a big obstacle in producing a high-purity polycrystalline silicon. Accordingly, controlling the concentration of methane in recovered hydrogen is an important problem with the production of high-purity polycrystalline silicon.

From such a viewpoint, as a measure against the generation of methane, surface treatment of a carbon member, and the like have been proposed (see, for example, Patent Literature 4 (Japanese Patent Laid-Open No. 5-213697), Patent Literature 5 (Japanese Patent Laid-Open No. 2009-62252)) for the purpose of suppressing the amount of methane to be generated through reaction of the carbon member and hydrogen in the reactor. However, the surface treatment of a carbon member being a consumable material is very expensive, so that a drastic increase in running cost is brought about, and besides, a slight amount of methane is generated even though the surface treatment is performed on the carbon member, and methane is generated through thermal decomposition of a slight amount of a hydrocarbon compound contained in trichlorosilane being a raw material, and therefore removal of methane in the reaction exhaust gas becomes necessary after all.

In addition, as a measure against the generation of methane due to the decomposition of hydrocarbon-containing impurities such as methyldichlorosilane contained in trichlorosilane, there is a report on control of the concentration of methane passing through an adsorption layer with activated carbon and oh the average pore radius and the like of activated carbon in Patent Literature 1 (Japanese Patent No. 3727470). However, because the concentration of methane in recovered hydrogen is low, as low as several hundred ppb to several ppm, and, on top of that, methane has the characteristic of being unlikely to be adsorbed onto activated carbon, an extremely large activated carbon-filling tank of industrial scale becomes necessary in order to keep the concentration of methane in a large amount of recovered hydrogen 1 ppm or less, so that there is a problem that the cost of facilities increases.

Besides, in Patent Literature 6 (Japanese Patent Laid-Open No. 2010-184831), there is proposed a method in which the retention time of a reaction exhaust gas in a condenser is lengthened to facilitate the dissolution of methane in chlorosilanes being a condensed liquid, thereby reducing the concentration of methane in recovered hydrogen. However, in this method, when the chlorosilanes that have absorbed methane are re-supplied to a reaction apparatus, the dissolved methane is also supplied to the reaction apparatus again.

CITATION LIST

Patent Literature

Patent Literature 1: Japanese Patent No. 3727470
Patent Literature 2: Japanese Patent Laid-open No. 2008-143775
Patent Literature 3: Japanese Patent Laid-Open No. 2011-84422
Patent Literature 4: Japanese Patent Laid-open No. 5-213697
Patent Literature 5: Japanese Patent Laid-open No. 2009-62252
Patent Literature 6: Japanese Patent Laid-Open No. 2010-184831

Non Patent Literature

Non Patent Literature 1: "RECENT CARBON TECHNOLOGY" written by Ishikawa, ToshiKatsu and Nagaoki, Toru
Non Patent Literature 2: "Report on Outcome of Commission Committed by New Energy Development Organization 1980-1987, Development of Solar Power Generation for Practical Use, Verification of Low Cost Silicon Experiments (development of reduction of chlorosilane by hydrogen), summary version" (New Energy and Industrial Technology Development Organization, November 1988)

SUMMARY OF INVENTION

Technical Problem

In this way, even though controlling the concentration of methane in recovered hydrogen is an important problem for producing a high-purity polycrystalline silicon, the conventional methods each have a drawback, and development of a new technique in which there are no such drawbacks is desired.

The present invention has been completed in consideration of the problem, and an object of the present invention is to provide a technique that enables to obtain high-purity polycrystalline silicon having small amounts of carbon impurities by efficiently removing methane in a reaction exhaust gas exhausted from a polycrystalline silicon production step without making a system configuration complicated to achieve high purification of recovered hydrogen, and then supplying the resultant high-purity hydrogen to the polycrystalline silicon production step again.

Solution to Problem

In order to solve the problem, a hydrogen gas recovery system according to the present invention is a hydrogen gas recovery system for separating and recovering a hydrogen gas from a reaction exhaust gas-exhausted from an apparatus for producing polycrystalline silicon using trichlorosilane as a raw material, the system comprising: A: a condensation and separation apparatus that condenses and separates chlorosilanes from a hydrogen-containing reaction exhaust gas exhausted from a polycrystalline silicon production step; B: a compression apparatus that compresses the hydrogen-containing reaction exhaust gas having passed through the condensation and separation apparatus; C: an absorption apparatus that absorbs and separates hydrogen chloride by contacting the hydrogen-containing reaction exhaust gas having passed through the compression apparatus with an absorption liquid; D: a first adsorption apparatus comprising an adsorption column filled with activated carbon for adsorbing and removing methane, hydrogen chloride, and part of the chlorosilanes each contained in the hydrogen-containing reaction exhaust gas having passed through the absorption apparatus; E: a second adsorption apparatus comprising an adsorption column filled with synthetic zeolite that adsorbs and removes methane contained in the hydrogen-containing reaction exhaust gas having passed through the first adsorption apparatus; and F: a gas line that recovers a purified hydrogen gas having a reduced concentration of methane, the gas having been exhausted from the second adsorption apparatus.

Preferably, the synthetic zeolite for filling in the second adsorption apparatus has a molecular ratio of silica ($SiO_2$) to alumina ($Al_2O_3$) each being a main component, ($SiO_2/Al_2O_3$), of 2 or more and 30 or less.

Moreover, preferably, the synthetic zeolite comprises any positive ion of sodium, potassium, calcium, magnesium, barium, and lithium as a positive ion.

In one aspect, the first adsorption apparatus comprises a plurality of the adsorption columns filled with activated carbon.

Moreover, in one aspect, the second adsorption apparatus comprises a plurality of the adsorption columns filled with synthetic zeolite.

Further, in one aspect, the hydrogen gas recovery system according to the present invention further comprises a gas line that utilizes the hydrogen gas purified with the second adsorption apparatus as a carrier gas to be used during regeneration of the adsorption column included in at least one of the first adsorption apparatus and the second adsorption apparatus.

Furthermore, in one aspect, the hydrogen gas recovery system according to the present invention further comprises: a gas line that utilizes the hydrogen gas purified with the second adsorption apparatus as a carrier gas to be used during regeneration of the adsorption column included in the second adsorption apparatus; and a gas line that utilizes an exhaust gas exhausted during the regeneration of the adsorption column included in the second adsorption apparatus as a carrier gas to be used during regeneration of the adsorption column included in the first adsorption apparatus.

A hydrogen gas separation and recovery method according to the present invention is a hydrogen gas separation and recovery method for separating and recovering a hydrogen gas from a reaction exhaust gas exhausted from an apparatus for producing polycrystalline silicon using trichlorosilane as a raw material, the method using the above-described hydrogen gas recovery system, and purifying the hydrogen gas to a concentration of methane in the hydrogen gas of 1 ppm or less with the second adsorption apparatus, and then recovering the resultant hydrogen gas.

Preferably, the hydrogen gas is purified to a concentration of hydrogen chloride in the hydrogen gas of 100 ppmv or less and a concentration of the chlorosilanes in the hydrogen gas of 100 ppmv or less with the first adsorption apparatus.

Moreover, preferably, regeneration of the adsorption column included in the second adsorption apparatus is performed at a pressure in the column during the regeneration of 0.3 MPa or less.

Advantageous Effect of Invention

According to the present invention, a technique that enables to obtain high-purity polycrystalline silicon having small amounts of carbon impurities is provided by efficiently removing methane in a reaction exhaust gas exhausted from a polycrystalline silicon production step without making a system configuration complicated to achieve high purification of recovered hydrogen, and then supplying the resultant high-purity hydrogen to the polycrystalline silicon production step again.

DESCRIPTION OF EMBODIMENTS

Hereinafter, an embodiment for carrying out the present invention will foe described in detail with reference to accompanying Drawings.

Figure 1:
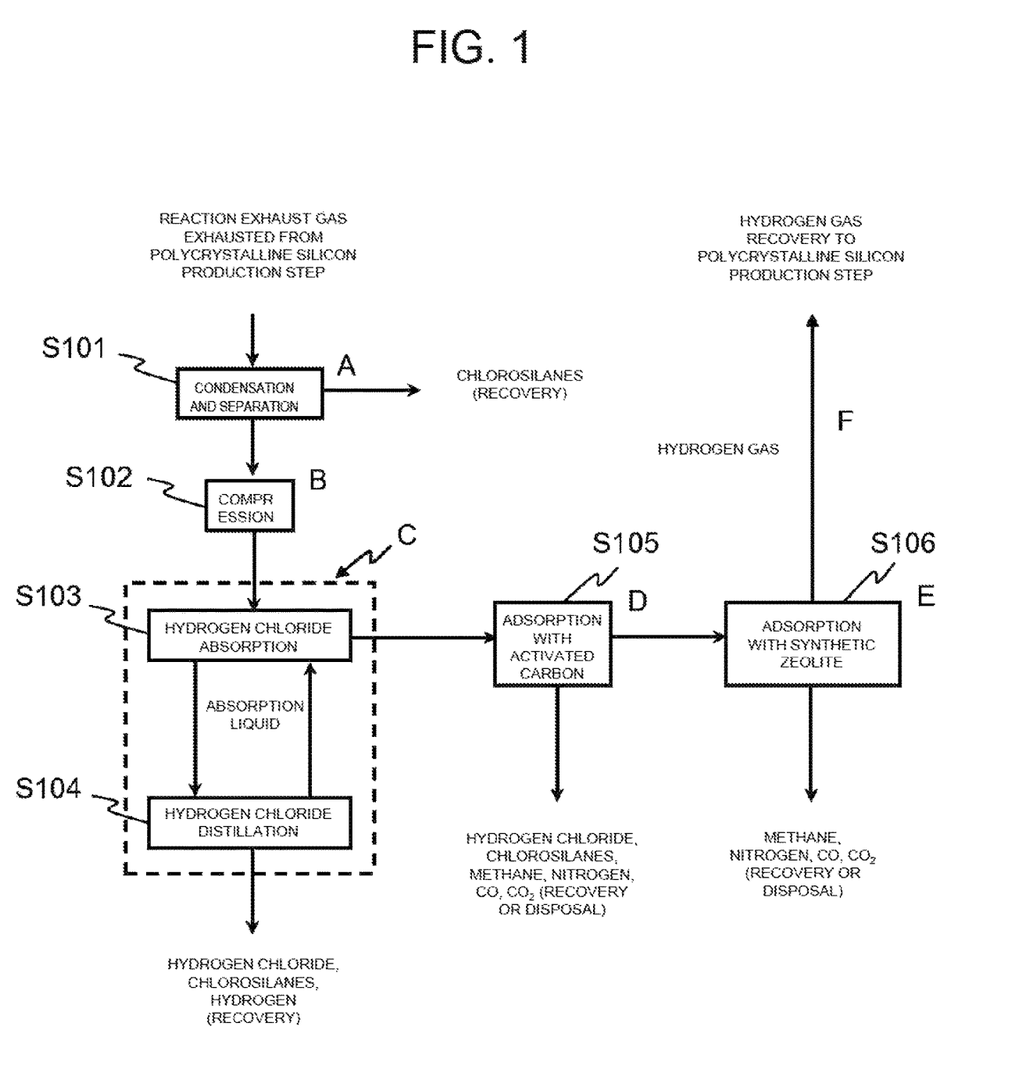
FIG. 1 shows a block diagram for illustrating a configuration example of a hydrogen gas recovery system according to the present invention.

FIG. 1 shows a block diagram for illustrating a configuration example of a hydrogen gas recovery system according to the present invention. In the example shown in this figure, the hydrogen gas recovery system is configured by a condensation and separation apparatus (A) that, condenses and separates chlorosilanes from a hydrogen-containing reaction, exhaust gas exhausted from a polycrystalline silicon production step; a compression apparatus (B) that compresses the hydrogen-containing reaction exhaust gas having passed through the condensation and separation apparatus (A); an absorption apparatus (C) that absorbs and separates hydrogen chloride by contacting the hydrogen-containing reaction exhaust gas having passed through the compression apparatus (B) with an absorption liquid; a first adsorption apparatus (D) comprising an adsorption column filled with activated carbon for adsorbing and removing methane, hydrogen chloride, and part of the chlorosilanes each contained in the hydrogen-containing reaction exhaust gas having passed through the absorption apparatus (C.); a second adsorption apparatus (E) comprising an adsorption column filled with synthetic zeolite that adsorbs and removes methane contained in the hydrogen-containing reaction exhaust gas having passed through the first adsorption apparatus (D); and a gas line (F) that recovers a purified hydrogen gas having a reduced concentration of methane, the gas having been exhausted from the second adsorption apparatus (E).

In this system, first, the reaction exhaust gas exhausted from a polycrystalline silicon production apparatus (not illustrated in the figure) is supplied to the condensation and separation apparatus (A), and condensation and separation of the chlorosilanes are performed (S101). This condensation and. separation step is arranged for the purpose of not only preventing the gas from being liquified inside the compression apparatus (B) in the next step to damage the device but also reducing heat load in the adsorption and removal step using the first adsorption apparatus in the step after next, and through this condensation and separation step, part of the chlorosilanes contained in hydrogen in the reaction exhaust gas is removed to be recovered outside the system.

Specifically, the reaction exhaust gas exhausted from the polycrystalline silicon production apparatus is cooled to exclude part of the chlorosilanes from the reaction exhaust gas. The cooling temperature may be equal to or lower than a temperature at which the chlorosilanes are not condensed under the pressure after the compression in the compression step using the compression apparatus (B). Accordingly, the cooling temperature may be −10° C. or lower, preferably −20° C. or lower.

In the compression step (S102) using the compression apparatus (B), the step following the condensation and separation step (S101), the pressure is increased up to a pressure that is necessary for feeding and circulating the exhaust gas after the condensation to the following step. The reaction exhaust gas condensed herein contains hydrogen, unseparated chlorosilanes, monosilane, hydrogen chloride, nitrogen, and methane, and, in addition to these, slight amounts of carbon monoxide and carbon dioxide.

In the hydrogen chloride absorption and separation step using the absorption apparatus (C), the step following the compression step (S102), a step of allowing the chlorosilanes and hydrogen chloride each contained in the reaction exhaust gas to be absorbed in the absorption liquid (S103) and a hydrogen chloride distillation step (S104) are appropriately repeated to exclude hydrogen chloride from the reaction exhaust gas and recover the excluded hydrogen chloride outside the system.

The absorption apparatus (C) comprises a hydrogen chloride absorption section that carries out step S103 and a hydrogen chloride distillation section that carries out step S104, the absorption liquid that mainly comprises liquid chlorosilanes is supplied from the hydrogen chloride distillation section to the hydrogen chloride absorption section, and when the reaction exhaust gas is brought into gas-liquid contact with this absorption liquid, the chlorosilanes and hydrogen chloride in the reaction exhaust gas are absorbed in the absorption liquid.

The hydrogen, chloride absorption section comprises a filling material or a tray, which is not illustrated in the figure, so that the gas-liquid contact can be performed efficiently. In addition, the gas-liquid contact is preferably performed at a low temperature and a high pressure for efficient absorption. Specifically, the gas-liquid contact is preferably performed at a temperature of −30° C. to −60° C. and at a pressure of 0.4 MPa to 2 MPa.

The reaction exhaust gas from which the chlorosilanes and hydrogen chloride have been removed with the absorption apparatus (C), the reaction exhaust gas comprising hydrogen as a main component, is introduced into the first adsorption apparatus (D) comprising an adsorption column filled with activated carbon. Unseparated chlorosilanes, monosilane, and hydrogen chloride are allowed to pass through a layer filled with activated carbon in the first adsorption apparatus to be adsorbed and removed, and are recovered and disposed outside the system (S105). In contrast, methane has the characteristic of being unlikely to be adsorbed onto activated carbon, and therefore most of methane is exhausted from the adsorption apparatus (D) without feeing adsorbed although a very small portion is removed by adsorption. Nitrogen, carbon monoxide, and carbon dioxide have the same characteristic as methane.

The first adsorption apparatus (D) preferably comprises a plurality of the adsorption columns filled with activated carbon. When the first adsorption apparatus comprises a plurality of the adsorption columns, the adsorption step with activated carbon (S105) can be carried out continuously without being suspended because while one adsorption column is regenerated, the exhaust gas can be supplied to another adsorption column. It is to be noted that with respect to activated carbon as an adsorbent, for example, a coconut shell-based or petroleum pitch-based molded article having an average pore radius of, for example, 5 μm to 20 μm can be used. In addition, the adsorption step with activated carbon is preferably performed at a low temperature and a high pressure for efficient adsorption. Specifically, the adsorption step with activated carbon is preferably performed at a temperature of −30° C. to +100° C., preferably −10° C. to +50° C., and at a pressure of 0.4 MPa to 2 MPa.

Regeneration of activated carbon (desorption) is efficiently performed at a high temperature and a low pressure, and therefore the pressure is decreased to −0.1MPa to +0.2 MPa or lower first, and then heating is performed to raise the temperature to 80° C. to 300° C., preferably 140° C. to 200° C. Hydrogen is allowed to flow as a carrier gas during regeneration to desorb the chlorosilanes, monosilane, hydrogen chloride, methane, nitrogen, carbon monoxide, and carbon dioxide each being adsorbed. The desorbed gas may be used in another process, may be recovered by returning it to the absorption apparatus (C) used in the prior step, or may be disposed.

The reaction exhaust gas from which the chlorosilanes, monosilane, and hydrogen chloride have been removed with the first adsorption apparatus (D), the gas comprising hydrogen as a main component, is introduced into the second adsorption apparatus (E) comprising an adsorption column filled with synthetic zeolite. In this adsorption apparatus (E), methane, nitrogen, carbon monoxide, and carbon dioxide which have not been completely removed with activated carbon in the prior step are adsorbed and removed by allowing the reaction exhaust gas to pass through the layer filled with synthetic zeolite (S106).

The second adsorption apparatus (E) also preferably comprises a plurality of the adsorption columns filled with synthetic zeolite. When the second adsorption apparatus comprises a plurality of the adsorption columns, the adsorption step with synthetic zeolite (S106) can be carried out continuously without being suspended because while one adsorption column is regenerated, the exhaust gas can be supplied to another adsorption column. In addition, the adsorption step with synthetic zeolite is preferably performed at a low temperature and a high pressure. Specifically, the adsorption step with synthetic zeolite is preferably performed at a temperature of −30° C. to +100° C., preferably −10° C. to +50° C., and at a pressure of 0.4 MPa to 2 MPa.

With respect to synthetic zeolite to be used as an adsorbent, synthetic zeolite having a high ability to adsorb a low concentration of methane is selected. Preferably, synthetic zeolite having a molecular ratio of silica ($SiO_2$) to alumina ($Al_2O_3$) each being a main component, ($SiO_2/Al_2O_3$), of 2 or more and 30 or less is used. Moreover, such synthetic zeolite preferably comprises any positive ion of sodium, potassium, calcium, magnesium, barium, and lithium as a positive ion.

Specific examples of synthetic zeolite that is suitable for use in the present invention include Zeolum (R) SA-600 (Tosoh Corporation) having a molecular ratio of silica ($SiO_2$) to alumina ($Al_2O_3$), ($SiO_2/Al_2O_3$), of 2 to 4; comprising Ca as a main positive ion; and having an X type crystalline structure, and zeolite having a molecular ratio ($SiO_2/Al_2O_3$) of 15 to 20; comprising K, Mg, and Ba as positive ions; and having a ferrierite type crystalline structure. These adsorbs an extremely large amount of methane in a hydrogen gas having a partial pressure of methane of 5 to 10 ppm, and specifically, the amount of methane to be adsorbed is extremely large, as large as several score times larger than that with active carbon (average pore radius of 8 Å) described in Patent Literature 1, so that miniaturization of the methane adsorption apparatus (E) can be achieved.

Regeneration of synthetic zeolite (desorption) as well as that of activate carbon is efficiently performed at a high temperature and a low pressure, and the pressure in the column during regeneration of the adsorption column is preferably set to 0.3 MPa or less. For example, the desorption can be performed easily by the above-described two-stage procedure in which the pressure is decreased to −0.1 MPa to +0.2 MPa or lower first, and then hydrogen is allowed to flow as a carrier gas while heating is performed to raise the temperature to 30° C. to 200° C., or only by allowing a carrier gas to flow without heating after reducing the pressure to −0.1 MPa to +0.2 MPa or lower without heating.

The desorbed gas may be used in another process, may be used as a carrier gas for the above-described desorption in the adsorption apparatus (D) with activated carbon, or may be disposed.

Figure 2:
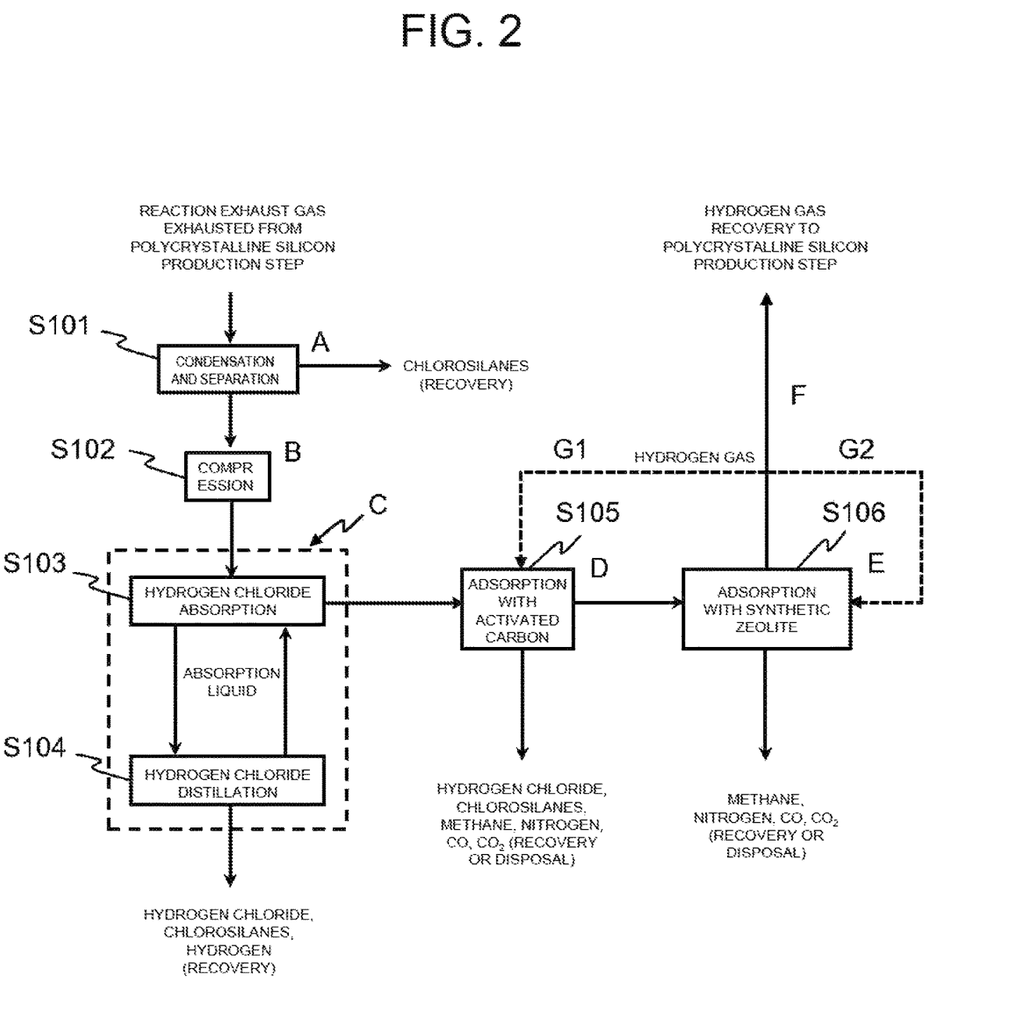
FIG. 2 shows a block diagram for illustrating another configuration example of a hydrogen gas recovery system according to the present invention.
Figure 3:
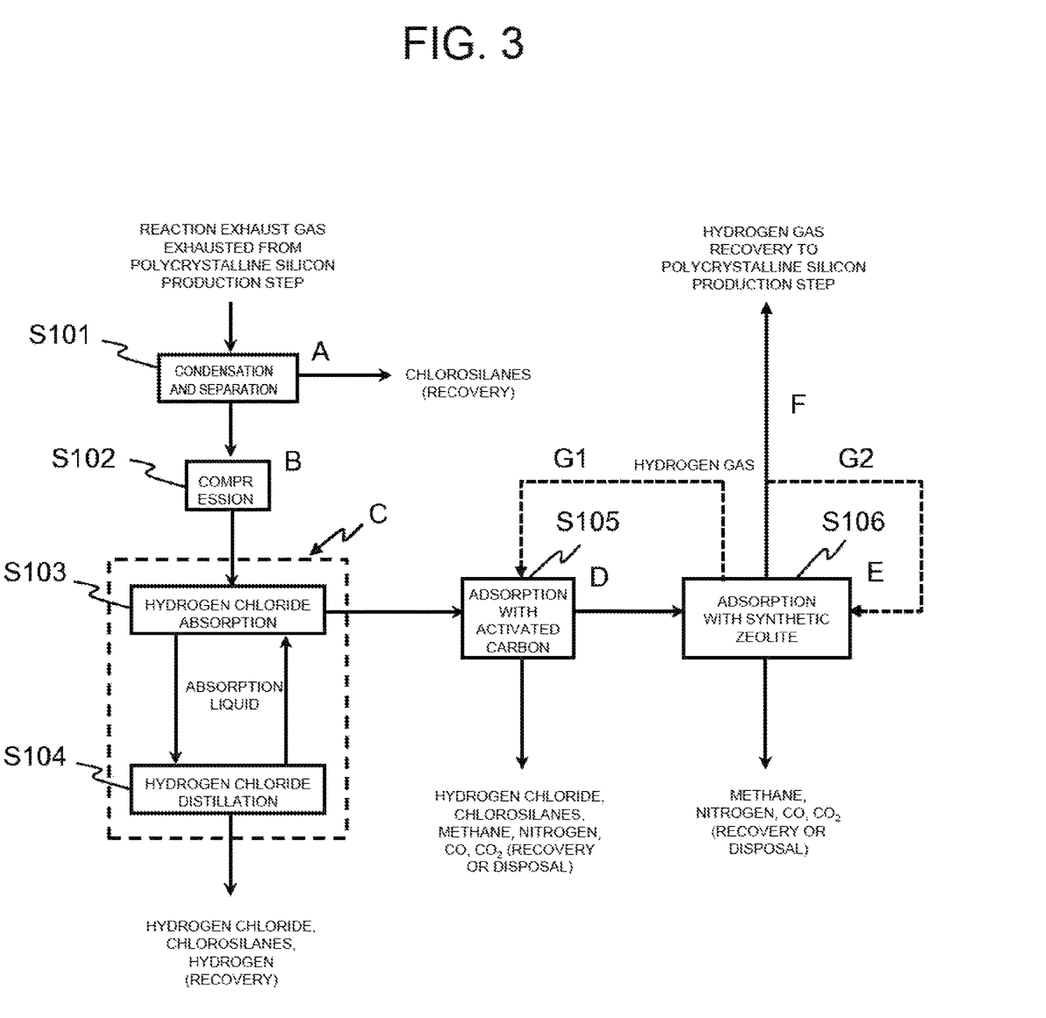
FIG. 3 shows a block diagram for illustrating yet another configuration example of a hydrogen gas recovery system according to the present invention.

FIG. 2 and FIG. 3 each show a block diagram for illustrating another configuration example of the hydrogen gas recovery system according to the present invention.

The hydrogen gas recovery system shown in FIG. 2 comprises a gas line (G1, G2) that utilizes the hydrogen gas purified with the second adsorption apparatus (E) as a carrier gas to be used during regeneration of the adsorption column included at least one of the first adsorption apparatus (D) and the second adsorption apparatus (E).

In addition, the hydrogen gas recovery system shown in FIG. 3 comprises: a gas line (G1, G2) that utilizes the hydrogen gas purified with the second adsorption apparatus (E) as a carrier gas to be used during regeneration of the adsorption column included in the second adsorption apparatus (E); and a gas line (G1, G2) that utilizes an exhaust gas exhausted during the regeneration of the adsorption column included in the second adsorption apparatus as a carrier gas to be used during regeneration of the adsorption column included in the first adsorption apparatus (D).

In any of the hydrogen gas recovery systems each given as an example in FIGS. 1 to 3, the hydrogen gas is purified to a concentration of methane in the hydrogen gas of 1 ppm or less with the second adsorption, apparatus (E), and the resultant hydrogen gas is recovered.

Synthetic zeolite has a high ability to adsorb methane that is nonpolar and that, has a small molecular diameter, and also has a high ability to adsorb methane in a low concentration region from several hundred ppb to several ppm, and on the other hand, hydrogen chloride and the chlorosilanes that are strongly polar are difficult to desorb. Accordingly, once synthetic zeolite adsorbs hydrogen chloride and the chlorosilanes, the ability to adsorb methane is lowered thereafter. Thus, the concentrations of hydrogen chloride and the chlorosilanes to be introduced into the adsorption apparatus (E) with synthetic zeolite need to be controlled.

Specifically, any of the concentrations of hydrogen chloride and the chlorosilanes is preferably controlled to be 100 ppmv or less, more preferably 10 ppm or less, and still more preferably 0.1 ppm or less.

Basically, the adsorption apparatus (D) with activated carbon in the prior step is designed and operated so that the concentrations of hydrogen chloride and the chlorosilanes are equal to or lower than the above-described concentrations; however, it is desirable to monitor the concentrations of hydrogen chloride and the chlorosilanes in the gas to be introduced into line adsorption apparatus (E) with synthetic zeolite just in case.

The method of monitoring the concentrations may be a method of monitoring the concentrations with an inline infrared absorption-analyzing apparatus, a method of allowing part of the gas to be absorbed in water, and then continuously monitoring ion concentrations, electrical conductivity, and the like, or a simplified method of allowing the gas to be absorbed in a phenolphthalein liquid, and then checking a change in color. In the case where the concentrations of hydrogen chloride and the chlorosilanes are equal to or higher than the specified concentrations, an action such as changing the adsorption column with activated carbon is taken.

In addition, adsorption of moisture in the air outside needs to be taken into consideration in initially filling synthetic zeolite in a column to be filled. Water also has a strong polarity and cannot be desorbed easily, and therefore caution such as filling synthetic zeolite while allowing a gas the dew point of which is controlled to flow in a container the temperature of which is controlled at a temperature of the dewpoint −10° C., preferably the dew point −60° C. is needed.

A filter for collecting zeolite fine powder is provided at the gas outlet of the adsorption apparatus (E) with synthetic zeolite. The filter having an opening of 10 μm or less is provided in order to prevent molded zeolite from collapsing due to variation in pressure during initial filling or during use to bring about flowing out of a fine powder generated into the following step.

EXAMPLES

Example 1

The chlorosilanes, monosilane, and hydrogen chloride were separated from a reaction exhaust gas exhausted from a polycrystalline silicon production apparatus and recovered hydrogen comprising 0.5 ppm of methane was introduced into a layer filled with synthetic zeolite to perform adsorption and removal of methane, and desorption of methane were performed.

As a methane adsorbent, ferrierite type crystalline zeolite being molded into a pellet of ϕ1.5 mm, having a molecular ratio of silica to alumina ($SiO_2/Al_2O_3$) of 17, and comprising K, Mg, Ba as positive ions was used. With respect to the size of a filled tank, the inner diameter ϕ is 22 mm, and the height H is 1,500 mm. The concentration of methane at the gas inlet and at the gas outlet of the tank filled with synthetic zeolite were analyzed by gas chromatography (detector FID, lower limit of quantitative measurement 0.01 ppm). Breakthrough was determined by the point of time when 1/10 of the concentration of introduced methane was detected at the outlet. The saturated adsorption amount, was determined by the point of time when a concentration of 98% or more of introduced methane was detected at the outlet.

In desorption, hydrogen was allowed to flow as a carrier gas through synthetic zeolite in a saturation adsorption state. Completion of desorption was determined to be the point in time when it was ascertained that the concentration of methane at the outlet of the filled layer was 0.01 ppm or less.

Results are shown in Table 1A (adsorption) and Table 1B (desorption) together with experimental conditions. The adsorption and desorption were repeated to find that the saturated adsorption amount of methane at 10th cycle was 1,620 μg, and the amount of carrier hydrogen necessary for regeneration was 900 NL. It is to be noted that there were no differences in the results between the 1st adsorption and the 10th adsorption to ascertain that the desorption was performed without a problem.

TABLE 1A

|  | Temperature [° C.] | Pressure [MPaG] | Concentration of methane before treatment [ppm] | Concentration of methane after treatment [ppm] | Velocity of treatment gas [NL/min] | Breakthrough adsorption amount [μg] | Total amount of treatment gas [NL] | Saturated adsorption amount of methane [μg] |
|---|---|---|---|---|---|---|---|---|
| Adsorption | 25 | 0.76 | 0.57 | >0.01 | 19.5 | 1,300 | 3,520 | 1,620 |

TABLE 1B

|  | Temperature [° C.] | Pressure [MPaG] | Flow rate of carrier [NL/min] | Total amount of carrier [NL] | Total amount of carrier Total amount of treatment gas |
|---|---|---|---|---|---|
| Desorption | 25 | 0.015 | 4.0 | 900 | 0.28 |

Polycrystalline silicon was produced using recovered hydrogen purified by allowing methane to be adsorbed as a raw material by the Siemens method. The concentration of carbon in the polycrystalline silicon was 0.04 ppma or less. The analysis of the concentration of carbon was worked out from the absorption coefficient at 607.5 cm$^{-1}$ in an infrared absorption spectrum at 80 K described in SEMI MF1391-0704. It is to be noted that the concentration of carbon in polycrystalline silicon produced using recovered hydrogen (concentration of methane of 0.5 ppm) in which removal of methane had not been performed was 0.15 ppma.

Comparative Example 1

Adsorption and removal of methane, and desorption of methane were performed under the same conditions as in Example 1 using activated carbon (coconut shell, molded into pellet, having average pore radius of 12 Å or less, in detail, average pore radius of 8 Å, specific surface area of 550 to 600 m$^2$/g, described in Patent Literature 1) as an adsorbent.

The results are shown in Table 2A (adsorption) and Table 2B (desorption) together with experimental conditions. The saturated adsorption amount of methane was 68 μg, and the amount of carrier hydrogen necessary for regeneration was 48 NL.

TABLE 2A

|  | Temperature [° C.] | Pressure [MPaG] | Concentration of methane before treatment [ppm] | Concentration of methane after treatment [ppm] | Velocity of treatment gas [NL/min] | Breakthrough adsorption amount [μg] | Total amount of treatment gas [NL] | Saturated adsorption amount of methane [μg] |
|---|---|---|---|---|---|---|---|---|
| Adsorption | 25 | 0.76 | 0.56 | >0.01 | 19.5 | 45 | 117 | 68 |

TABLE 2B

|  | Temperature [° C.] | Pressure [MPaG] | Flow rate of carrier [NL/min] | Total amount of carrier [NL] | Total amount of carrier Total amount of treatment gas |
|---|---|---|---|---|---|
| Desorption | 25 | 0.015 | 4.0 | 48 | 0.41 |

The amount of methane adsorbed to activated carbon is less than 1/20 of the amount of methane adsorbed to synthetic zeolite shown in Example 1. Moreover, activated carbon needs the original unit of hydrogen necessary for desorption ([total amount of carrier]/[total amount of treatment, gas] in Tables) 1.5 times larger than synthetic zeolite and therefore is inferior economically. Polycrystalline silicon was produced using recovered hydrogen purified by allowing methane to be adsorbed as a raw material by the Siemens method. The concentration of carbon in the crystal was 0.04 ppma or less which was the same as that in Example 1.

INDUSTRIAL APPLICABILITY

The present invention provides a technique that enables to remove methane in a reaction exhaust gas exhausted from a polycrystalline silicon production step efficiently without making a system configuration complicated, thereby achieving high purification of recovered hydrogen.

REFERENCE SIGNS LIST

A Condensation and separation apparatus
B Compression apparatus
C Absorption apparatus
D First adsorption apparatus
E Second adsorption apparatus
F, G1, G2 Gas line

The invention claimed is:

1. A hydrogen gas recovery system for separating and recovering a hydrogen gas from a reaction exhaust gas exhausted from an apparatus for producing polycrystalline silicon using trichlorosilane as a raw material, the system comprising:
   A: a condensation and separation apparatus configured to condense and separate chlorosilanes from a hydrogen-containing reaction exhaust gas exhausted from a polycrystalline silicon production;
   B: a compression apparatus configured to compress the hydrogen-containing reaction exhaust gas that has passed through the condensation and separation apparatus;
   C: an absorption apparatus configured to absorb and separate hydrogen chloride by contacting the hydrogen-containing reaction exhaust gas that has passed through the compression apparatus with an absorption liquid;
   D: a first adsorption apparatus comprising at least one first adsorption column filled with activated carbon that adsorbs and removes methane, hydrogen chloride, and part of the chlorosilanes from the hydrogen-containing reaction exhaust gas that has passed through the absorption apparatus;
   E: a second adsorption apparatus comprising at least one second adsorption column filled with synthetic zeolite that adsorbs and removes methane contained in the hydrogen-containing reaction exhaust gas that has passed through the first adsorption apparatus, the synthetic zeolite being a ferrierite having a molecular ratio of silica ($SiO_2$) to alumina ($Al_2O_3$) ($SiO_2/Al_2O_3$) of from 15 to 20 and comprising at least one positive ion selected from the group consisting of potassium, magnesium, and barium; and
   F: a first gas line configured to recover a purified hydrogen gas having a reduced concentration of methane, the purified hydrogen gas having been exhausted from the second adsorption apparatus,
   wherein the purified hydrogen gas has a concentration of methane of 1 ppm or less.

2. The hydrogen gas recovery system according to claim 1,
wherein each of the silica ($SiO_2$) and alumina ($Al_2O_3$) is a main component of the synthetic zeolite.

3. The hydrogen gas recovery system according to claim 1, wherein the first adsorption apparatus comprises a plurality of the first adsorption columns filled with the activated carbon.

4. The hydrogen gas recovery system according to claim 1, wherein the second adsorption apparatus comprises a plurality of the second adsorption columns filled with the synthetic zeolite.

5. The hydrogen gas recovery system according to claim 1, further comprising a second gas line configured to utilize the purified hydrogen gas as a carrier gas to be used for regenerating at least one of the activated carbon in the first adsorption column and the synthetic zeolite in the second adsorption column.

6. The hydrogen gas recovery system according to claim 1, further comprising: a third gas line configured to utilize the purified hydrogen gas as a carrier gas to be used for regenerating the synthetic zeolite in the second adsorption column; and a fourth gas line configured to utilize an exhaust gas exhausted during the regeneration of the synthetic zeolite in the second adsorption column as a carrier gas to be used for regenerating the activated carbon in the first adsorption column.

7. A hydrogen gas separation and recovery method for separating and recovering a hydrogen gas from a reaction exhaust gas exhausted from an apparatus for producing polycrystalline silicon using trichlorosilane as a raw material,
the method using the hydrogen gas recovery system according to claim 1, and the method comprising:
purifying the hydrogen gas to a concentration of methane in the hydrogen gas of 1 ppm or less with the second adsorption apparatus, and then
recovering the purified hydrogen gas.

8. The hydrogen gas separation and recovery method according to claim 7, comprising purifying the hydrogen gas to a concentration of hydrogen chloride in the hydrogen gas of 100 ppmv or less and a concentration of chlorosilanes in the hydrogen gas of 100 ppmv or less with the first adsorption apparatus.

9. The hydrogen gas separation and recovery method according to claim 7, comprising regenerating the synthetic zeolite in the second adsorption column under a condition where a pressure in the second adsorption column is 0.3 MPa or less.

\* \* \* \* \*